US008984974B2

(12) United States Patent
Seitz et al.

(10) Patent No.: US 8,984,974 B2
(45) Date of Patent: Mar. 24, 2015

(54) PUMP TRANSMISSION WITH PTO GEAR AND INDEPENDENTLY CLUTCHED IMPELLER

(75) Inventors: Douglas W. Seitz, Eau Claire, WI (US); Michael C. Ruthy, Chippewa Falls, WI (US)

(73) Assignee: W.S. Darley & Co., Itasca, IL (US)

( * ) Notice: Subject to any disclaimer, the term of this patent is extended or adjusted under 35 U.S.C. 154(b) by 1039 days.

(21) Appl. No.: 11/956,598

(22) Filed: Dec. 14, 2007

(65) Prior Publication Data

US 2008/0141800 A1 Jun. 19, 2008

Related U.S. Application Data

(60) Provisional application No. 60/870,086, filed on Dec. 14, 2006.

(51) Int. Cl.
*F16H 37/00* (2006.01)
*A62C 25/00* (2006.01)

(52) U.S. Cl.
CPC .................................... *A62C 25/005* (2013.01)
USPC ................................ 74/15.86; 74/11; 74/15.6

(58) Field of Classification Search
CPC ..................................................... A62C 25/005
USPC ............... 415/122.1, 123; 416/169 R, 170 R; 74/11–15.88; 417/223
See application file for complete search history.

(56) References Cited

U.S. PATENT DOCUMENTS

| | | | | | |
|---|---|---|---|---|---|
| 2,571,105 | A | * | 10/1951 | Bickel et al. | 415/112 |
| 2,888,998 | A | * | 6/1959 | Senkowski et al. | 180/53.4 |
| 3,232,125 | A | * | 2/1966 | Lee et al. | 74/15.86 |
| 3,540,297 | A | * | 11/1970 | Wagner et al. | 74/15.86 |
| 3,717,045 | A | * | 2/1973 | Burenga | 74/15.6 |
| 4,086,019 | A | * | 4/1978 | Poole | 415/18 |
| 4,587,862 | A | | 5/1986 | Hoffman | |
| 4,610,175 | A | * | 9/1986 | Weis et al. | 74/15.86 |
| 4,751,989 | A | * | 6/1988 | Shinokawa et al. | 192/13 R |
| 4,773,277 | A | * | 9/1988 | Cook et al. | 74/377 |
| 5,145,014 | A | | 9/1992 | Eberhardt | |
| 5,228,355 | A | * | 7/1993 | Smith et al. | 74/467 |
| 5,492,034 | A | | 2/1996 | Bogema | |
| 5,645,363 | A | * | 7/1997 | Dafforn et al. | 403/3 |
| 5,913,547 | A | * | 6/1999 | Fernandez | 29/525.02 |
| 6,073,502 | A | * | 6/2000 | Wallace | 74/15.86 |
| 6,457,560 | B1 | * | 10/2002 | Evans et al. | 184/6.12 |
| 6,497,313 | B1 | * | 12/2002 | Blalock | 192/18 A |
| 2005/0184528 | A1 | | 8/2005 | Storm et al. | |

(Continued)

OTHER PUBLICATIONS

Ex. Lee W. Young, International Search Report—Mailed May 20, 2008, PCT/US07/87626, Filed Dec. 14, 2007.

(Continued)

*Primary Examiner* — Alan B Waits
(74) *Attorney, Agent, or Firm* — Anthony J. Bourget

(57) ABSTRACT

A firefighting pump transmission for use with an emergency vehicle pump comprising a housing receiving a drive shaft, the drive shaft having a PTO gear affixed thereto within the housing, an impeller shaft for turning an impeller of a pump, and means for selectively powering the impeller shaft from the drive shaft, the means for powering may include a multi-disk clutch. The transmission allows for powering the PTO gear while the impeller shaft is idle. A Commercially Available PTO device may be mounted to the housing to power a variety of devices.

21 Claims, 15 Drawing Sheets

(56) References Cited

U.S. PATENT DOCUMENTS

| | | | | |
|---|---|---|---|---|
| 2005/0258012 | A1* | 11/2005 | Graves | 192/15 |
| 2006/0107660 | A1 | 5/2006 | Kawamura et al. | |
| 2007/0284156 | A1 | 12/2007 | Grady et al. | |
| 2007/0286736 | A1* | 12/2007 | Grady et al. | 417/34 |

OTHER PUBLICATIONS

Ex. Lee W. Young, Written Opinion of the International Searching Authority—Mailed May 20, 2008, PCT/US07/87626, Filed Dec. 14, 2007.

* cited by examiner

PUMP TRANSMISSION WITH PTO GEAR AND INDEPENDENTLY CLUTCHED IMPELLER

CROSS-REFERENCE TO RELATED APPLICATIONS

Applicant claims priority based on Provisional Patent Application No. 60/870,086, filed Dec. 14, 2006, the entirety of which is incorporated herein by reference.

BACKGROUND OF THE INVENTION

1. Field of the Invention

The present invention relates generally to transmissions capable of powering multiple devices from a single drive shaft, and more specifically to pumps and pump transmissions capable of powering an impeller shaft of a fluid pump and at least another device, and particularly to emergency vehicle pumps and transmissions of such variety.

2. Background Information

Transmissions capable of powering a primary device and at least another device are not new. Some transmissions, especially in the automotive or truck areas, include a drive for powering a primary device, such as an axle of the vehicle, and may also include a power take-off, commonly known as a PTO. A PTO device is designed to power an auxiliary device, drawing power from the main drive of the transmission. In some instances an auxiliary device itself might take power off from (or directly connect to) the main transmission, as opposed to coupling with an intermediate PTO device. A PTO device typically attaches to the main transmission and in turn powers an auxiliary device. Typically a transmission includes an internal gear, i.e., a "PTO gear", to which the auxiliary device or to which the PTO device couples in order for the auxiliary device or the PTO device to be driven.

Pump transmissions, including pump transmissions of the fire-fighting variety have also been designed to power a primary device such as a pump, and at least another device, such as a booster pump or a compressor. One such system includes extending the impeller shaft out the opposite side of the gearbox of a pump transmission. One end of the impeller shaft is engaged with the pump impeller while the opposite end is available for use to power another device. In other systems, an additional gear may be included inside the gearcase to provide a power output. An example of such additional gearing is found in the patent to Hoffman, U.S. Pat. No. 4,587,862, issued May 13, 1986. In Hoffman, an input member 30 alternately powers an output member 32 or a pump shaft 18 by means of a sliding gear 70. A further example of a system that provides additional gearing is found in the patent to Eberhardt, U.S. Pat. No. 5,145,014, where the transmission powers a rotating pump shaft 18 and an air compressor 13.

In other firefighting pump transmission systems an opening is provided on the gearcase or housing of a primary transmission to receive a specially designed auxiliary transmission or device. A specially designed PTO device is used to couple the primary transmission to the auxiliary device. The auxiliary system may be equipped with a sliding clutch gear to engage or disengage a driven device. For instance, an auxiliary device such as a booster pump or compressor may typically be mounted to the housing or closely coupled to the housing of a firefighting pump transmission. An example of such a system is the model LDMH pump manufactured by W.S. Darley & Company, Chippewa Falls, Wis.

SUMMARY

While the prior pump transmissions power a primary device and also allow for the powering of an auxiliary device or devices, they are limited such that in order to power a PTO gear within the casing of the transmission, the pump or impeller shaft must be powered. This has not been viewed as a problem but, rather, a fact of life or a necessary aspect of such devices. Heretofore there was little or no purpose in decoupling the pump from the PTO device since auxiliary devices used in conjunction with the pump or pump transmission require the pump. Indeed, auxiliary devices such as compressors or boosters require the pump and its water in order to operate. The present inventors have recognized, however, that running the PTO gear without running the impeller shaft would provide numerous benefits, such as prolonging pump life, allowing for running of an auxiliary device in situations where pump water is scarce or lacking, providing versatility options for a pump transmission to power a variety of devices that otherwise would not be justified running due to excessive pump wear, among many other benefits. The present inventors have also recognized that since the PTO gear may be driven independently from the pump, the particular features of the PTO gear can also be independent of the pump. For instance, the type and size of the PTO gear does not have to be influenced by the speed requirements or other particulars of the pump. A spur gear, instead of a helical gear may be used for the PTO gear. Different gear spacing and helix angles, the number of gear teeth, and other aspects of the gearing can be modified or used to accommodate compatibility with a variety of auxiliary and PTO devices. Advantageously, the PTO gear may be configured to engage with a Commercially Available (instead of a specially designed) PTO device. Thus, running the PTO gear without running the impeller shaft provides even further benefits.

Affixing a PTO device 50 (such as a Commercially Available PTO device) to the pump transmission 20 for powering an auxiliary device which is not useful or not critical to the operation of the pump would not make sense, for in order to run the auxiliary device would necessarily require driving the impeller shaft 40. Preferably the impeller shaft is run only when required in order to preserve the useful life of the pump. Typically, the pump impeller is driven only a small percentage of the time an emergency vehicle is called to action in the field. As such, configuring the PTO device to operate independently of the impeller shaft provides further benefits.

In accordance with the invention, then, the versatility of a firefighting pump transmission is enhanced by independently powering, from a common drive shaft, a PTO gear and an impeller shaft. Such arrangement allows for independent use of an auxiliary device without having to run the pump, and among other benefits, also accommodates use of a variety of auxiliary devices heretofore otherwise being impractical for use with a pump transmission.

In particular embodiments of the invention, the PTO gear is affixed to the transmission drive shaft. Also, a clutch is placed on the impeller shaft. In a particular aspect, the clutch is coupled to the transmission drive shaft via a clutch driving gear. A clutch driving gear is connected to the drive shaft and couples with a clutch gear of the clutch. Clutching devices of various types may be used, however, a multi-disk clutch placed on the impeller shaft is most advantageous. Mounting the "chuck" portion of the multi-disk clutch on the impeller shaft allows the impeller shaft to be powered "on" when the clutch is activated. Also in a particular aspect the clutch driving gear is connected adjacent to or in contact with the PTO gear, and both rotate together as the drive shaft turns. Each of these details provides particular advantages and can be implemented independently of the others.

The PTO gear attached to the drive shaft can be of any desired variety. A PTO gear of a spur gear is most advantageous, however.

Also in particular embodiments, a PTO device is attached to the transmission and is coupled with the PTO gear situated inside a casing of the transmission. Particular aspects include mounting the PTO device to a side of the casing (i.e., avoiding a mounting to the front or rear of the casing).

Advantageously, in particular embodiments the transmission of the present invention accommodates or includes a mounting of a "Commercially Available PTO device" as described further below. In additional aspects, an optional drive-line is used in conjunction with the transmission. Also in particular aspects, a device powered by the PTO gear mounts remotely from the transmission. In particular aspects, a drive shaft or a hydraulic adapter are included with the PTO device.

In additional aspects the impeller shaft includes a spline feature for mounting of an auxiliary device. In particular aspects, such auxiliary device includes a brake or a hydraulic pump. In additional aspects the transmission includes a lubrication system and pump for lubricating and cooling transmission components.

In particular embodiments in accordance with a further aspect of the invention, the problem of independently powering a PTO gear and an impeller shaft from a single drive shaft of a firefighting pump transmission is solved by affixing the PTO gear to the drive shaft and clutching the impeller shaft. In particular aspects, clutching of the impeller shaft includes attachment of a clutch driving gear to the drive shaft adjacent the PTO gear. Further optional aspects include mounting a PTO device to the transmission and coupling the PTO device with a drive line to power a remote auxiliary device.

The above summary provides that the powering of the PTO gear is not dependent on the powering of the pump (i.e., the impeller shaft need not move in order to drive the PTO gear). The concept may be alternatively stated in terms of selectively powering the impeller shaft while powering the PTO gear. Indeed, powering of the PTO gear is independent of powering the impeller shaft.

The above summary of the present invention is not intended to describe each illustrated embodiment or every implementation or aspect of the present invention. The figures and detailed description that follow more particularly exemplify these embodiments.

Figure 1:
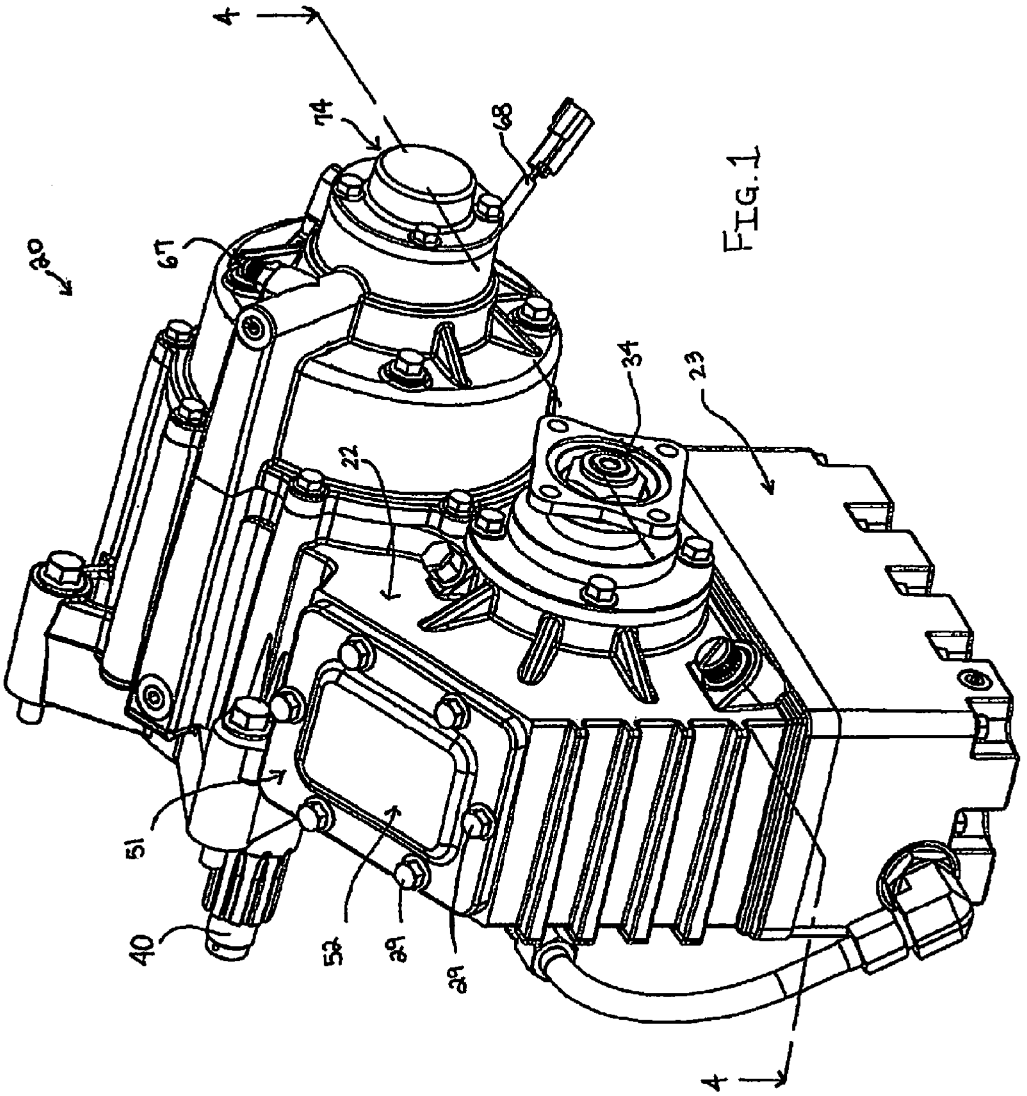
FIG. 1 is a perspective view of a firefighting pump transmission embodying the principles of the present invention.

While the invention is amenable to various modifications and alternative forms, specifics thereof have been shown by way of example in the drawings and will be described in detail. It should be understood, however, that the intention is not necessarily to limit the invention to the particular embodiments or aspects described. On the contrary, the intention is to cover all modifications, equivalents, and alternatives falling within the spirit and scope of the invention and as defined by the appended claims.

DETAILED DESCRIPTION

Figure 14:
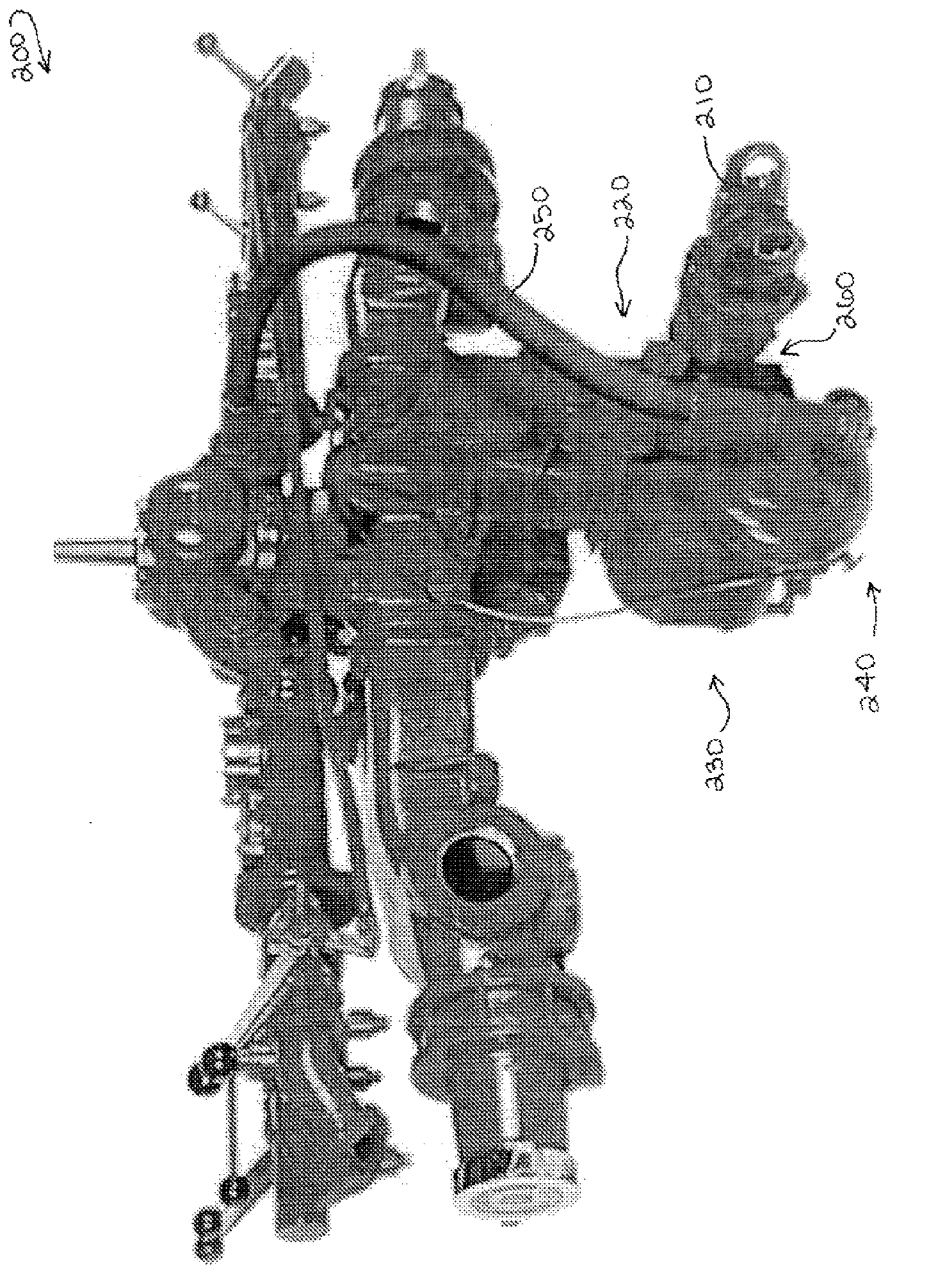
Fig. 14 (PRIOR ART)
FIG. 14 depicts a type of pump and pump transmission known in the prior art.

Among the pumps and pump transmissions known in the prior art are those referenced above in the background section and the device shown in FIG. 14. The FIG. 14 device shows a pump/pump transmission 200. An input shaft (which is a shaft positioned opposite output shaft 210) enters the housing of the transmission 220 at a front portion of the transmission 220. An auxiliary transmission 230 is mounted to the side of the transmission 220. The auxiliary transmission 230 powers a smaller pump 240 which is fed by a hose 250. In this prior system, pump 240 operates as a booster for the pump/pump transmission 200, achieving higher pressures than the pump 200 would otherwise achieve.

The auxiliary transmission 230 is equipped with a sliding clutch gear (not shown) to engage or disengage the PTO driven device 240. In the illustrated case, the driven device (auxiliary) is the smaller pump 240. The PTO driven device 240 might alternatively be a compressor. The transmission 230 is a two-gear transmission that mounts to the side of main transmission 220 and operates as a power-take-off PTO device.

Within the housing 260 of pump/pump transmission 200, a gear (not shown) of transmission 230 couples with a "drive gear" that is mounted on input shaft 210. The drive gear powers both PTO device 230 and an idler gear which in turn powers a third gear within housing 260 to power the impeller shaft of pump and transmission 200. As the drive gear turns, both the PTO device 230 and the main impeller shaft within housing 260 are powered. There are also other known types of firefighting pump transmissions that use a PTO to power an auxiliary device where the PTO is powered together with the impeller shaft.

The known firefighting pump transmissions lack versatility because the impeller shaft must be powered in order for the PTO gear or the auxiliary device to be powered. As noted above, it remained for the present inventors to recognize that having a PTO gear powered independently of the impeller shaft would provide numerous benefits, as detailed hereinabove. Indeed, the transmissions referenced in the background and in FIG. 14 may power an auxiliary device, yet such transmissions are limited as compared to the present invention.

Figure 2:
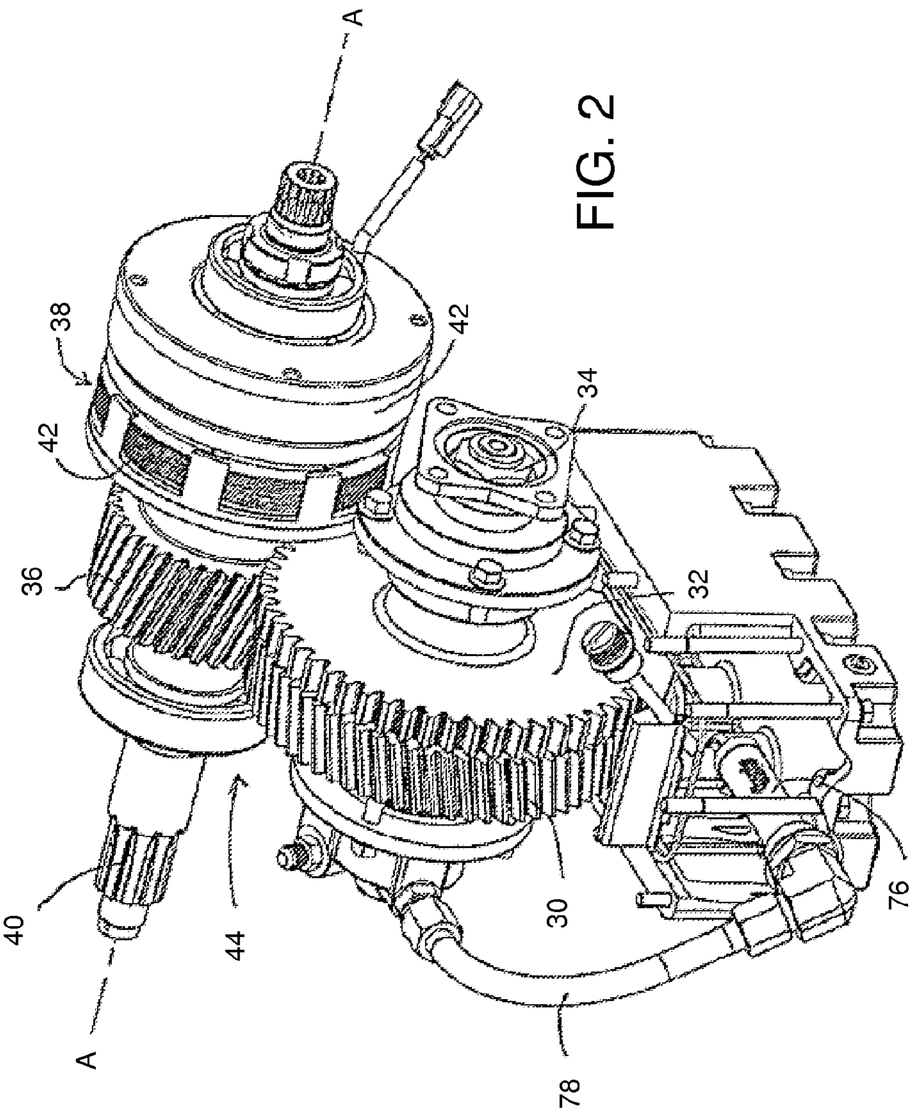
FIG. 2 is a further perspective view of the transmission of FIG. 1 having portions removed for clarity.
Figure 3:
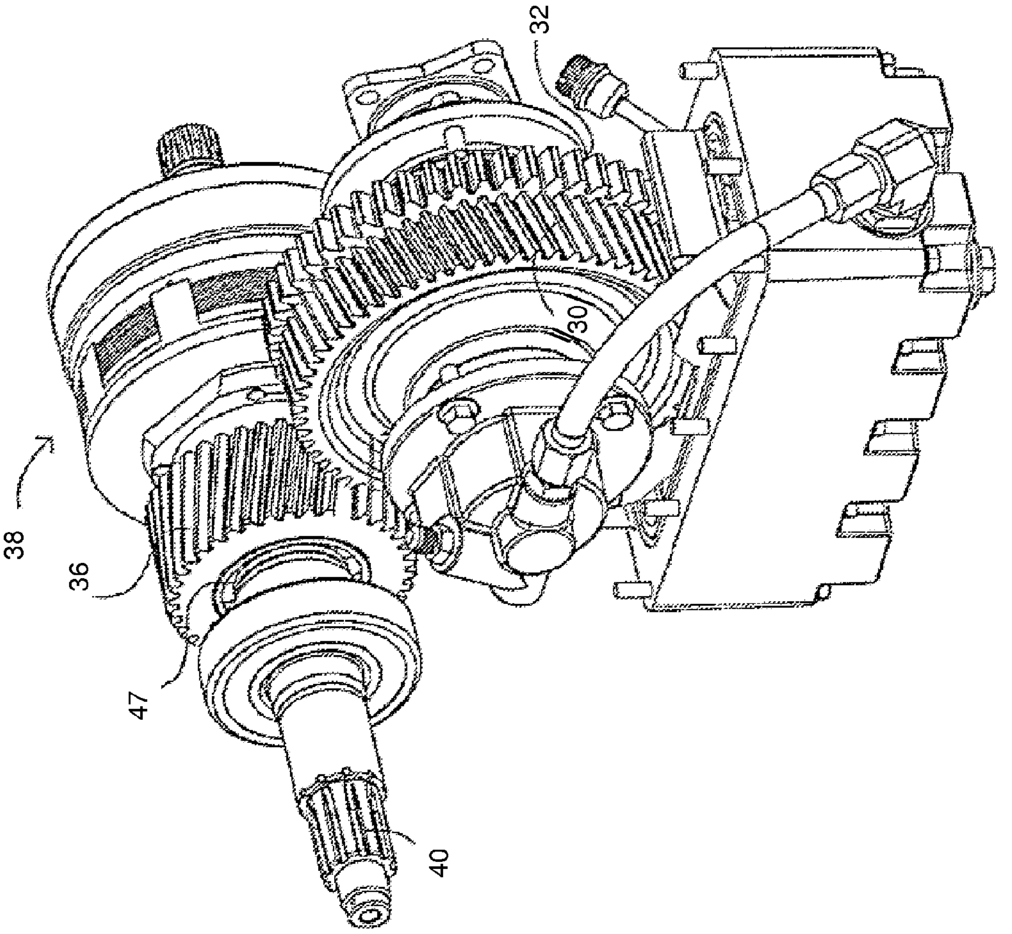
FIG. 3 is a further perspective view of the transmission of FIG. 1 having portions removed for clarity.

Referring to FIGS. 1-13, a transmission embodying the principles of the present invention is generally depicted with reference to numeral 20. In one aspect, transmission 20 is a fluid pump transmission and includes a housing 22. Transmission 20 operates with a pump of a firefighting variety and may be used on a firetruck or other emergency response vehicle. Housing 22 is preferably made from cast metal such as iron, preferably aluminum. Housing 22 is a single-piece construction and may attach to or include a bottom 23. Housing 22 receives a drive shaft 34 which enters housing 22 in conventional fashion. Drive shaft 34 connects to a clutch driving gear 30 within housing 22 (See FIGS. 2-4). Clutch driving gear 30 is operatively coupled to an impeller shaft 40. Transmission 20 further includes a PTO gear 32 affixed to drive shaft 34. In accordance with the invention, the versatility of firefighting pump transmission 20 is enhanced by independently powering, from a common drive shaft 34, the PTO gear 32 and the impeller shaft 40. In one particular aspect, impeller shaft 40 is selectively powered by means of a clutch, such as clutch 38. While drive shaft 34 and gears 32 and 30 may rotate together, clutch 38 allows for impeller shaft 40 to remain idle. When clutch 38 is activated, impeller shaft 40 rotates.

Preferably clutch 38 couples clutch driving gear 30 with impeller shaft 40. Clutch 38 includes a clutch gear 36. Clutch driving gear 30 engages with clutch gear 36. While other varieties may be used, preferably clutch driving gear 30 is a helical gear matched to a corresponding helical gear 36. Together clutch driving gear 30 and clutch gear 36 form a pump gear set 44 (See FIG. 2). The number of teeth used on gear set 44 may be altered to achieve a desired drive shaft-to-impeller shaft ratio. Gear set 44 may include multiple gears, however use of a pair of gears such as gear 30 and clutch gear 36 is preferred. It may be appreciated that the particular gear set 44 may be established to have a rotational output speed which matches an optimal impeller rotation speed of a given pump 60 which may be engaged with impeller shaft 40.

As drive shaft 34 spins, clutch driving gear 30 spins which in turn spins clutch gear 36 to operate impeller shaft 40 when clutch 38 is activated. Pump 60 includes impeller 41. When impeller shaft 40 turns, impeller 41 turns. When clutch 38 is deactivated, clutch gear 36 spins freely upon shaft 40 and rides on bearings 47. Clutch 38 is preferably of a well known multi-disk variety having disk plates 42. Clutch 38 includes a chuck portion 43 which is securely mounted to impeller shaft 40. As the clutch gear 36 spins, so do some of the plates 42. When clutch 38 is activated, plates 42 bind upon or within chuck 38, thereby causing chuck 38 and impeller shaft 40 to turn. The speed of rotation of impeller shaft 40 is dependent in part on the speed of rotation of drive shaft 34 and the gearing ratio of gear set 44. It may be appreciated that the speed of rotation of impeller 40 may be different from the speed of rotation of drive shaft 34.

As referenced above, transmission 20 includes a PTO gear 32 affixed to drive shaft 34. PTO gear 32 is affixed to shaft 34 so that it rotates as shaft 34 spins, and further preferably does not slide along shaft 34 but remains in a set position. While other varieties may be used, preferably PTO gear 32 is of a spur gear variety and is positioned within housing 22. PTO gear 32 allows for gearing the pump 60 and the PTO device 50 (See FIGS. 8-10) independently. More preferably, PTO gear 32 is configured to engage with a Commercially Available power take-off, or PTO 50. A “Commercially Available” PTO device is one that mounts to a standard PTO opening of a casing, particularly such devices that mount to openings having a six or eight bolt pattern as defined under Society of Automotive Engineers Standard SAE J704, as well as openings having a ten bolt pattern for mounting on an Allison transmission. One non-limiting example of a spur gear 32 for use in conjunction with the invention includes a gear 32 which matches to fit a receiving gear 54 (See FIG. 8) of PTO 50 where the PTO receiving gear 54 is also a spur gear. It may be appreciated that gear 32 may be configured to match other types of receiver gears, yet is preferably configured to operate with Commercially Available PTO devices. Other non-limiting examples of Commercially Available PTO 50 devices that may be used with the invention include Chelsea and Muncie (not shown) varieties. Together, gear 32 and receiver gear 54 form a PTO gear set 46 (See FIG. 10). The number of teeth used on gear set 46 may be altered to achieve a desired drive shaft-to-PTO output shaft ratio. Gear set 46 may include multiple gears, however use of a pair of gears such as gear 32 and receiver gear 54 is preferred. It may be appreciated that the particular gear set 46 may be established to have a rotational output speed which matches an optimal rotational speed of a given accessory device (accessory device not shown). Non-limiting examples of some accessory devices include booster pumps, compressors, foam concentrate pumps, generators or other devices.

Figure 4:
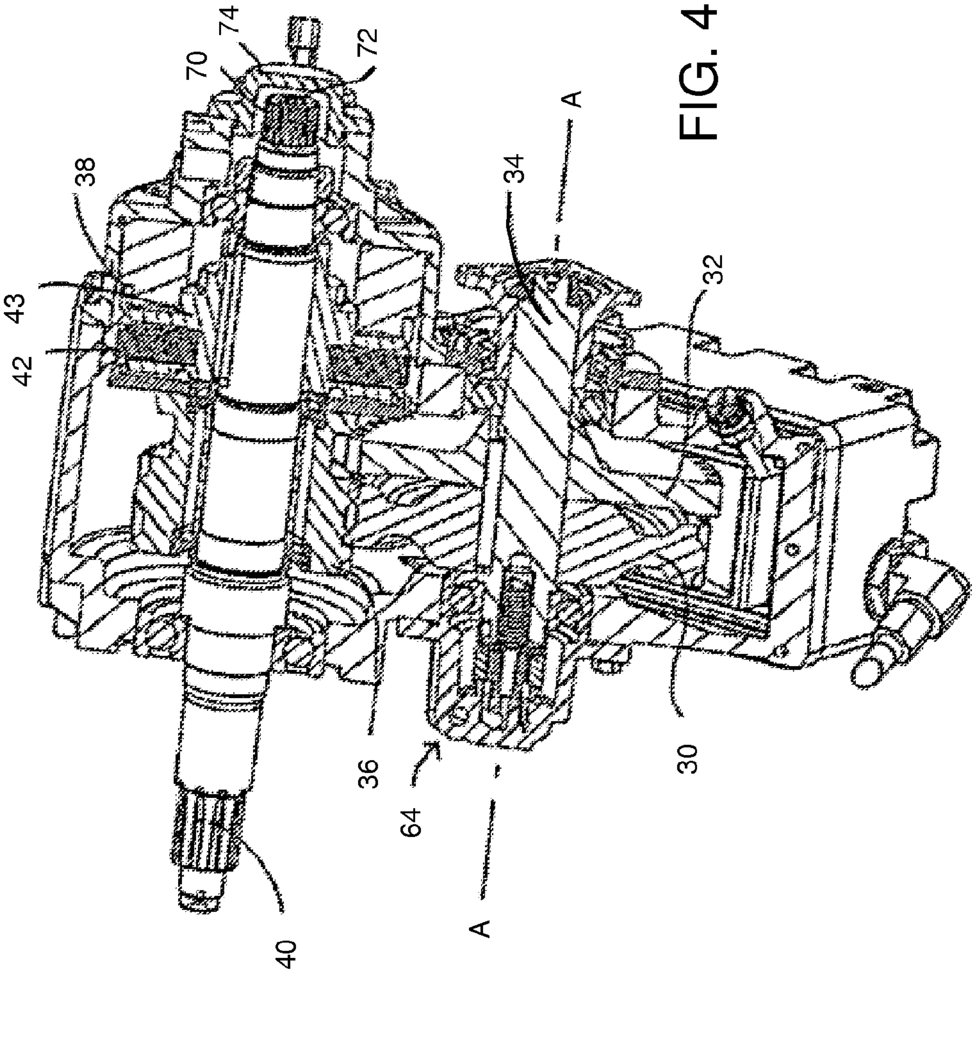
FIG. 4 is a section view taken along line 4-4 of FIG. 1.
Figure 5:
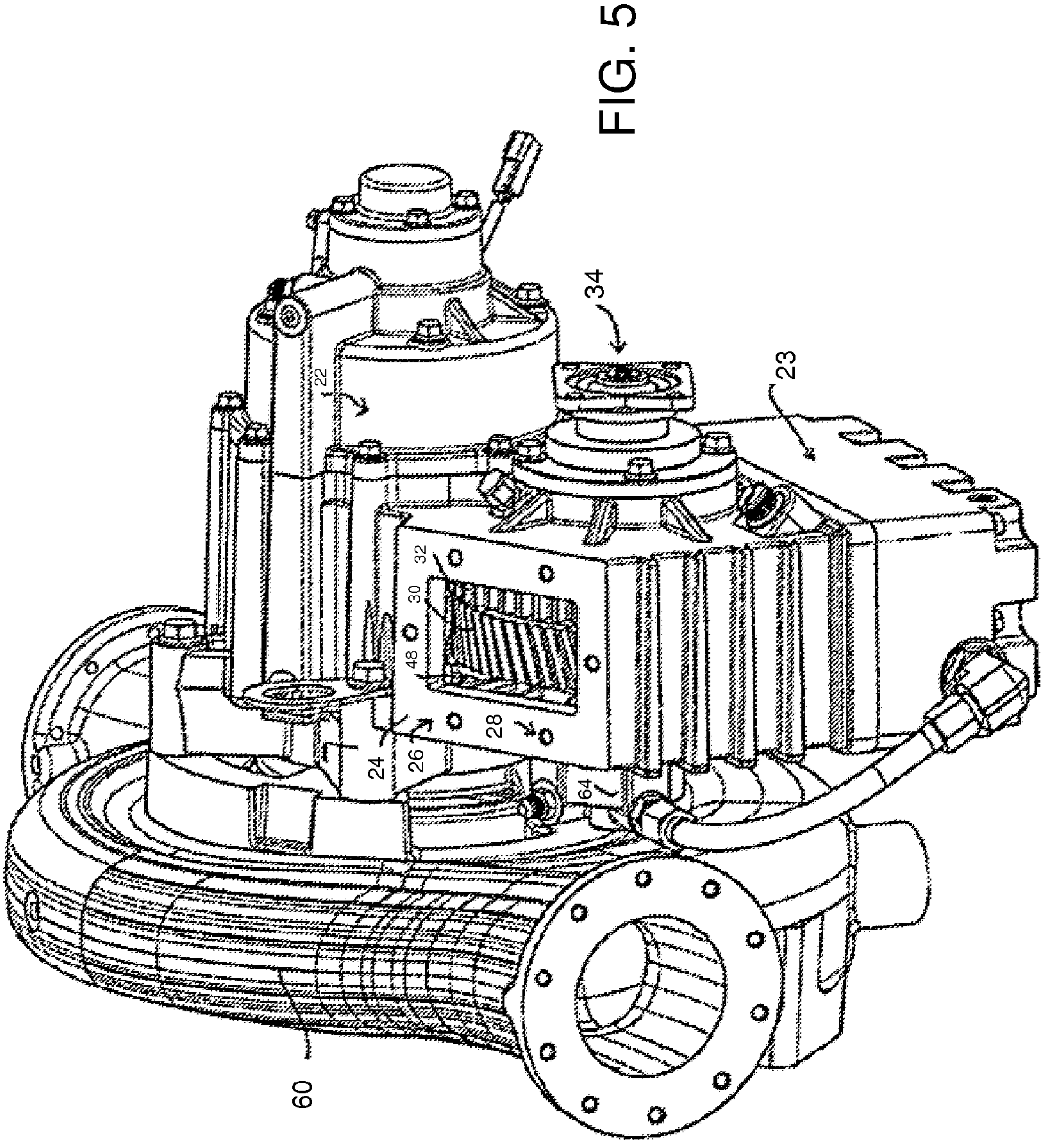
FIG. 5 is a perspective view of the transmission of FIG. 1 equipped with a pump and having plate removed.
Figure 6:
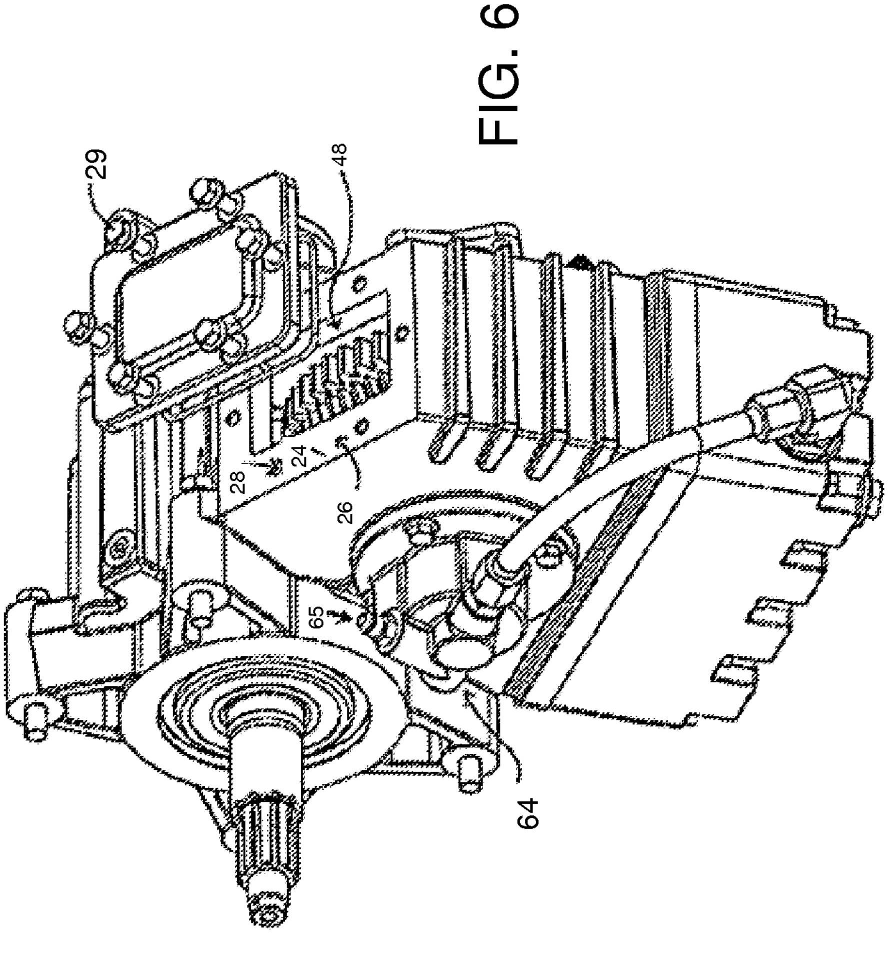
FIG. 6 is a partial perspective exploded view of a pump transmission embodying the principles of the present invention.
Figure 7:
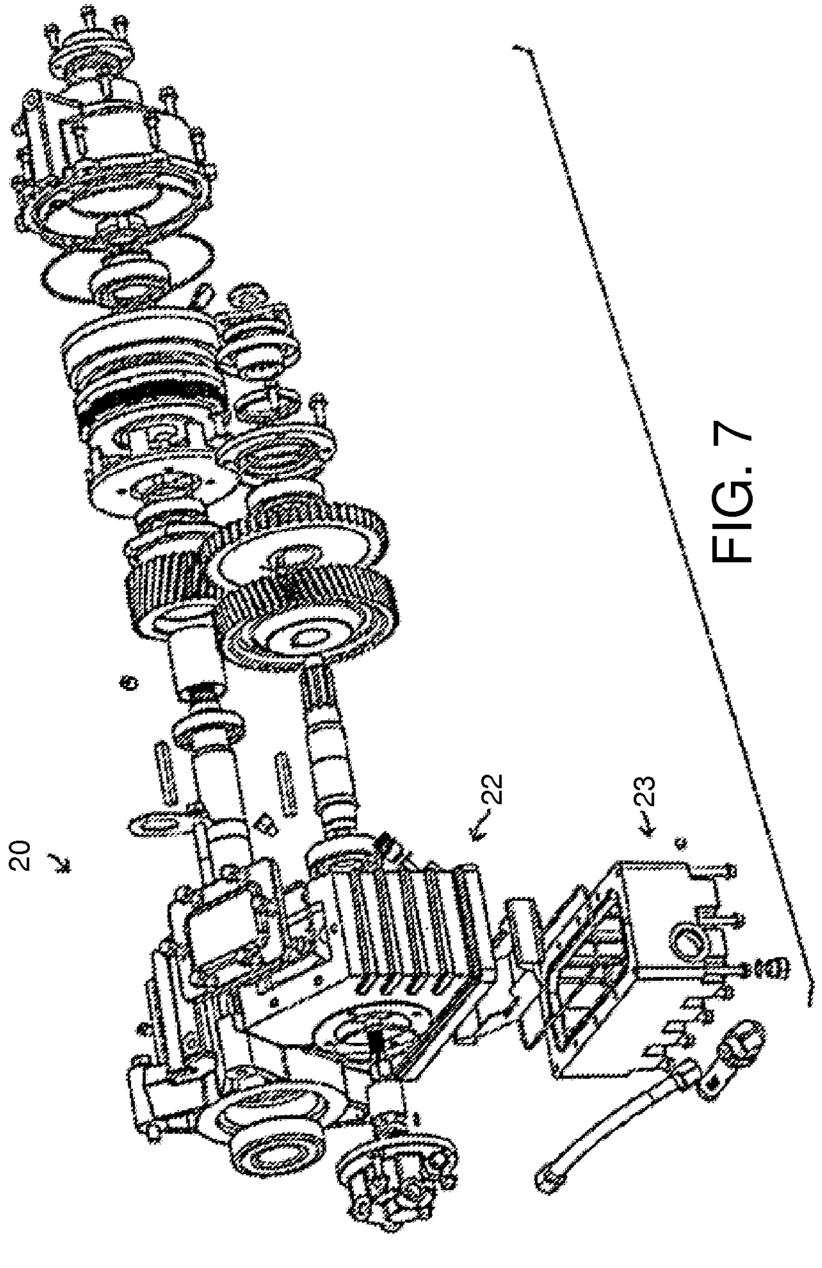
FIG. 7 is an exploded perspective view of the transmission of FIG. 1.
Figure 8:
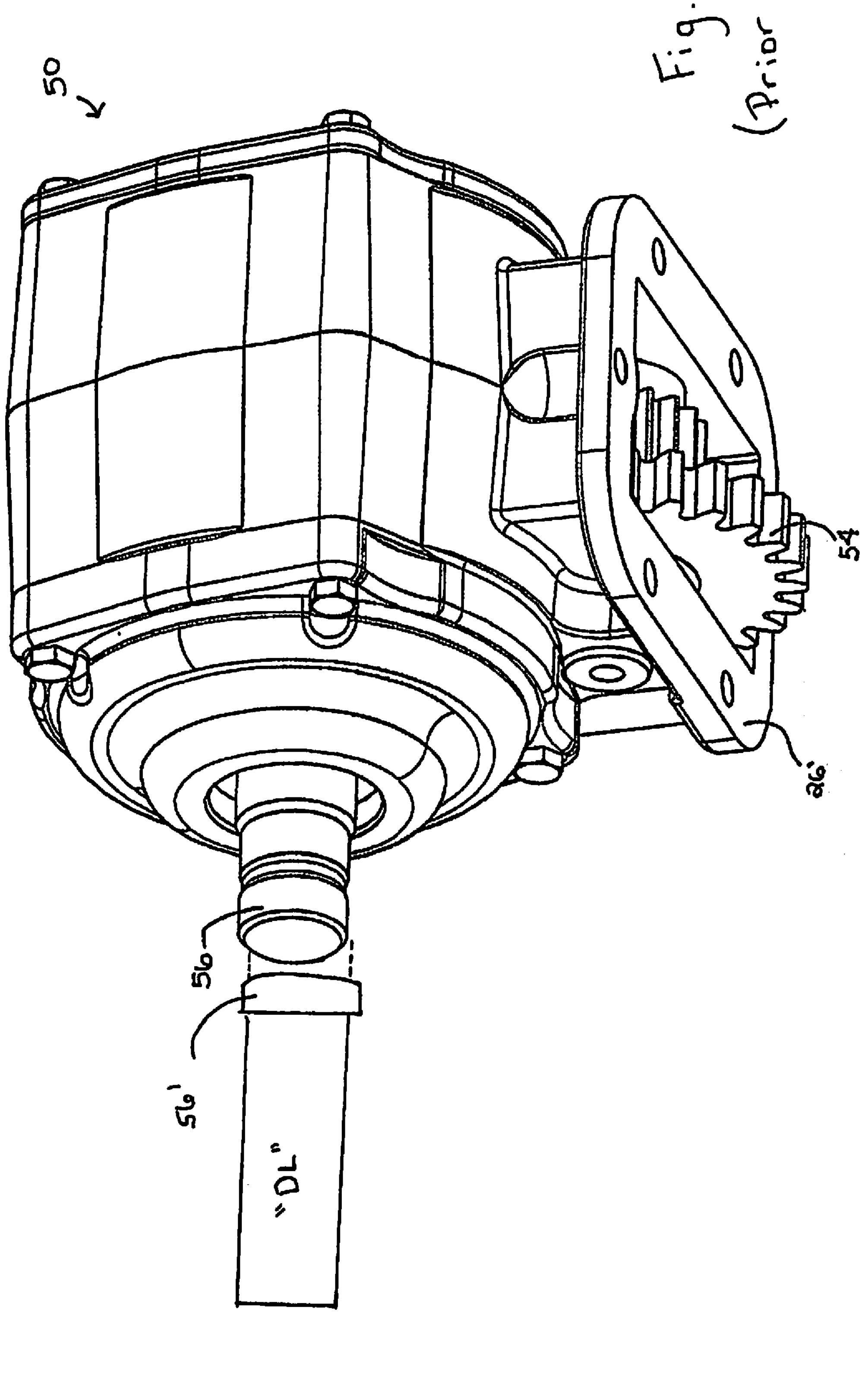
Fig. 8 (Prior Art)
FIG. 8 is a bottom perspective view of a PTO device known in the prior art.
Figure 9:
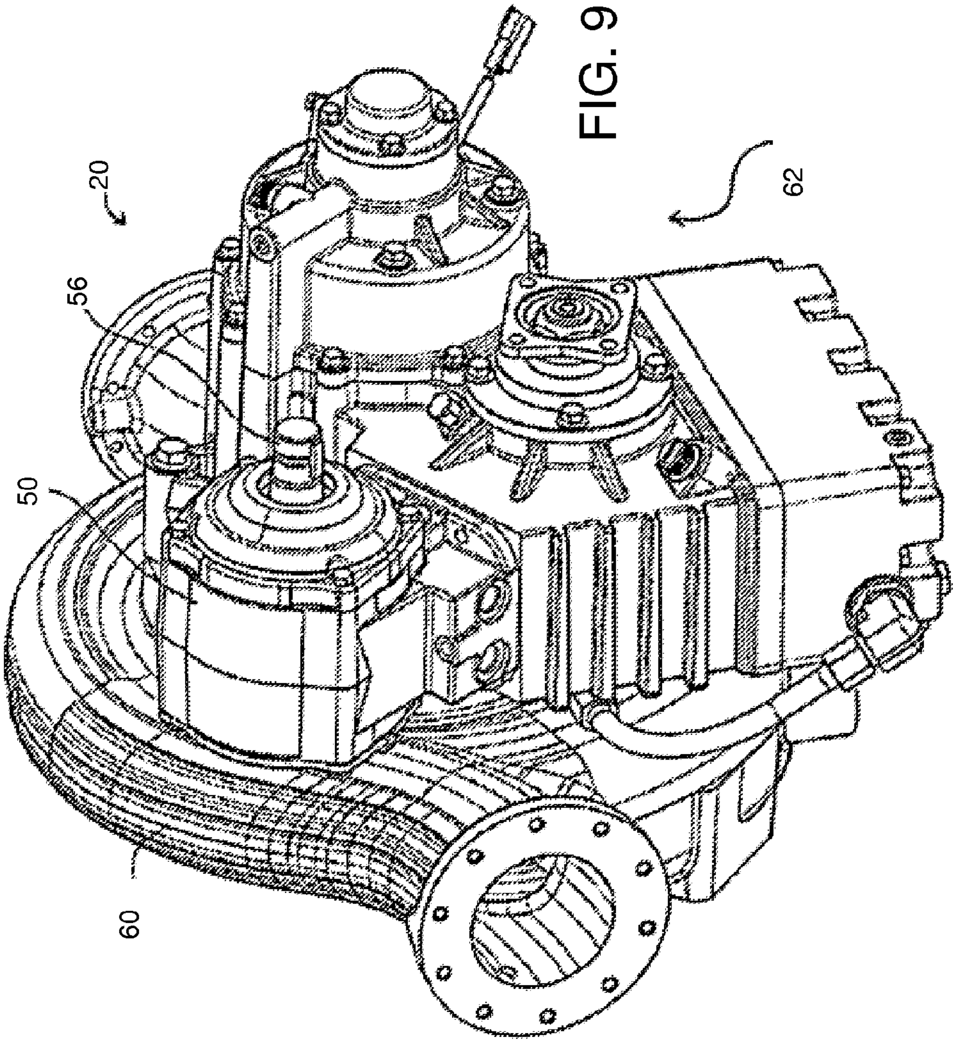
FIG. 9 is a perspective view of a pump and transmission and PTO device embodying the principles of the present invention.
Figure 10:
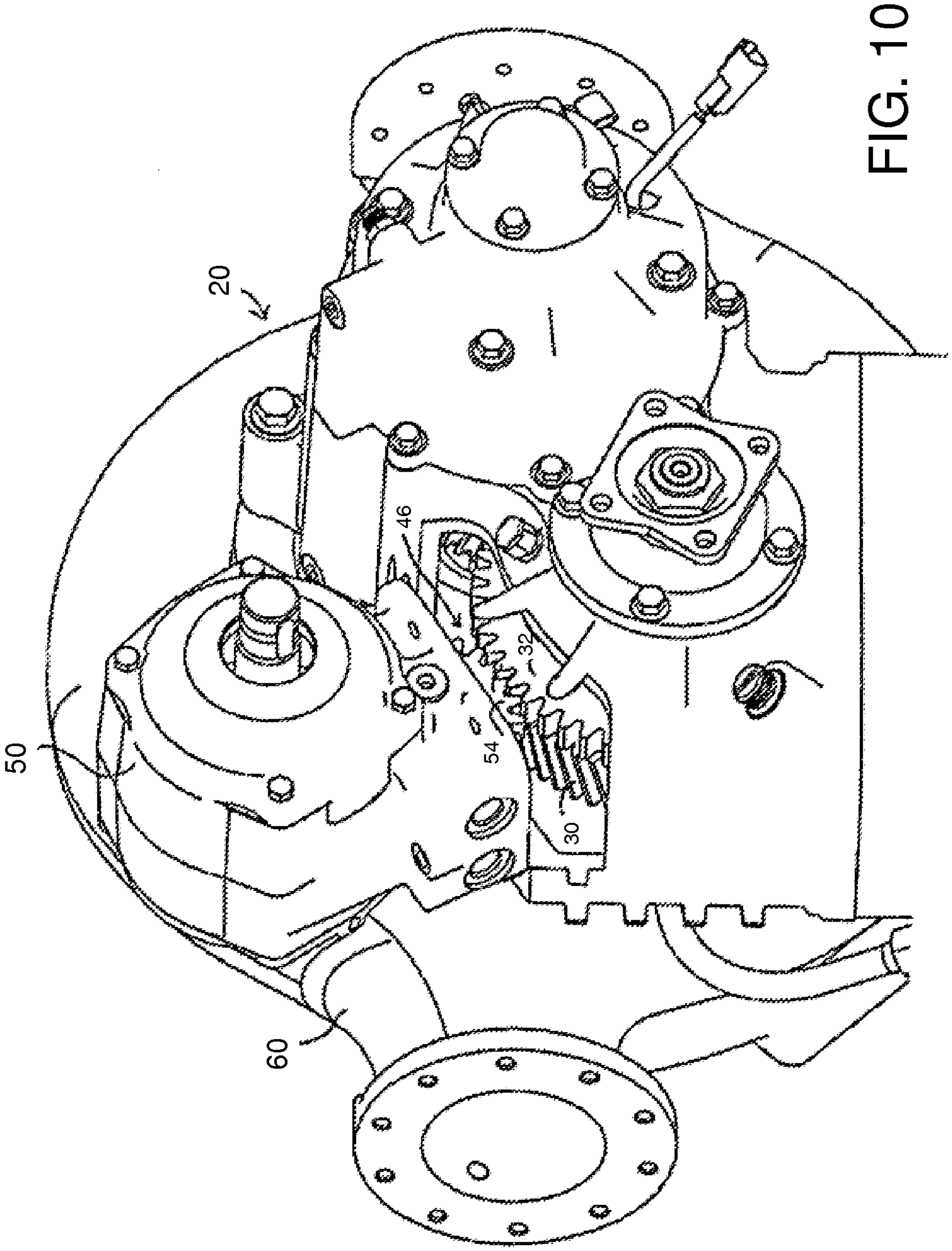
FIG. 10 is a perspective view of a pump and transmission having a PTO device embodying the principles of the present invention and where a portion of the housing is removed for illustration.

Preferably housing 22 defines a PTO port 48 (See FIG. 5). PTO port 48 allows for access to the inner space of housing 22 where clutch driving gear 30 and PTO gear 32 operate. Preferably port 48 is positioned adjacent clutch driving gear 30 and PTO gear 32. Preferably housing 22 includes a substantially flat mounting face 24. Face 24 is situated on an exterior of housing 22 and preferably about a perimeter 26 of the PTO port 48. Preferably perimeter 26 is dimensioned to match a perimeter 26' of PTO 50 (See FIG. 8). Preferably mounting face 24 includes at least one bolt hole 28, and more preferably includes at least six bolt holes 28 as shown, and most preferably includes holes or openings having a six or eight bolt pattern as defined under Society of Automotive Engineers Standard SAE J704 or openings having a ten bolt pattern for mounting on an Allison transmission or similar casing. When PTO device 50 is not mounted to transmission 20, plate 52 is mounted to housing 22 which covers PTO port 48 and clutch driving gear 30 and PTO gear 32. Bolts 29 are used to mount plate 52 to housing 22. While other sizes and varieties are possible, preferably plate 52 is a generally rectangular, planar body which defines and lies on a plane oriented substantially parallel to a longitudinal axis A (see FIG. 4) of drive shaft 34. Preferably mounting face 24 defines a plane oriented substantially parallel to a longitudinal axis A of drive shaft 34. The plane preferably also runs parallel with the gear flanks of the PTO gear 32 (in the case where PTO gear is a spur gear). It may be appreciated that where mounting face 24 defines a plane oriented substantially parallel to a longitudinal axis A of drive shaft 34, a mounting of a PTO 50 thereupon provides for a preferred and improved engagement between receiver gear 54 and spur gear 32. Were such orientation not substantially parallel, receiver gear 54 might otherwise be skewed or out of alignment when engaged with gear 32 or when attempting to couple gear 54 and gear 32. Further, port 48 is positioned on a side of transmission 20 as generally shown.

Clutch driving gear 30 and PTO gear 32 may have different diameters and different teeth arrangements. Preferably PTO gear 32 is a spur gear adapted to match with a receiver gear 54 of a PTO 50. Having different gear sets 44, 46 allows for using a common drive shaft 34 to operate impeller 40 while simultaneously (or alternatively) operating PTO 50. It may be appreciated that an accessory device (not shown) such as an air compressor, or a generator, or a secondary pump, or other device, including devices that may be useful on a emergency vehicle such as a fire truck, may be operated from power take-off area 51 (see FIG. 1). It may be appreciated that operation of accessory device is made possible, or at least easier, due to the ability to incorporate a PTO gear set 46 (See FIG. 10) which is different from impeller-clutch gear set 44. Particularly, lower (or higher) spin ratios of a PTO output shaft 56 may be achieved as desired. It may be appreciated that additional gear or gears (not shown) may be included within PTO device 50 to accommodate variation of output spin of PTO output shaft 56. Also, a clutch or clutch set (not shown) may be used with or within PTO device 50 to selectively engage or disengage power to an accessory device. In this manner the accessory device may be shut down while powering impeller shaft 40, thus providing further versatility.

Advantageously, use of a Commercially Available PTO device accommodates use of an accessory device to be remotely positioned due to the ability to drive a PTO drive line (schematically represented and designated as “DL” in FIG. 8) which may extend outward or away from PTO 50 and housing 22. Drive-line DL may include a shaft 56' attached to or comprising output shaft 56, and may be equipped with a U-joint or yoke elements, or may include a hydraulic coupling. For instance, an accessory may be generally positioned in the region designated by numeral 62 (or some other region whether on the housing 22 or to a component of a firetruck or other structure). Such orientation allows freedom from having to configure a mounting directly to housing 22, or other relatively close coupling to transmission 20.

Figure 15:
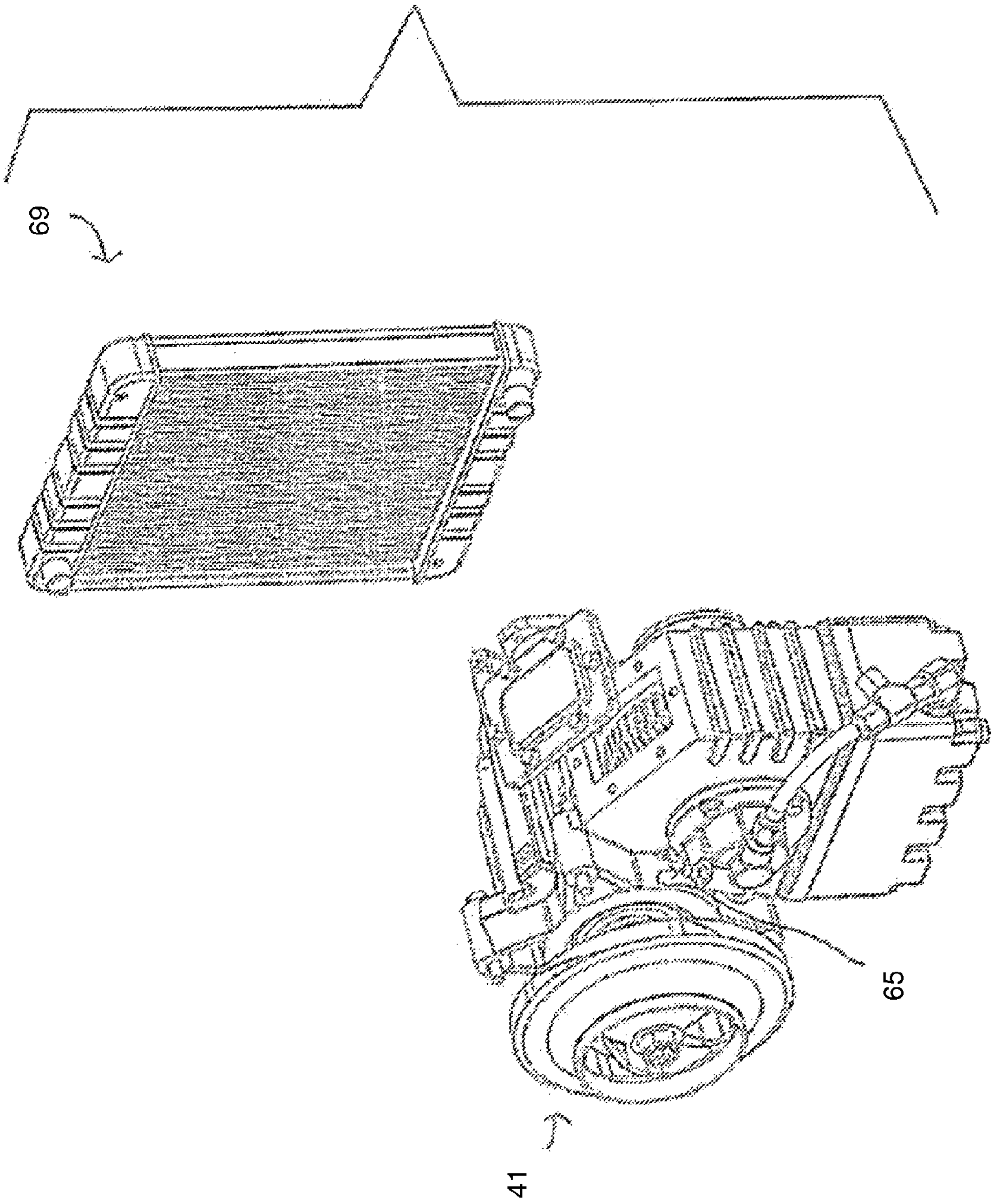
FIG. 15 is a perspective view of a firefighting pump transmission embodying principles of the present invention.

A situation unique to this present pump transmission arrangement arises where the impeller shaft 40 or pump 50 is not activated. When the PTO gear 32 runs, water circulation from the pump 50 is otherwise not available for cooling. Thus, the gears of the PTO device 50, as well as the PTO gear 32 and the other gears and elements within the housing 22 require cooling and/or lubrication. A lubricant is thus circulated under pressure to and from the housing 22. Further shown in FIG. 4 is an oil or lubricant pump 64. Oil pump 64 pressure-feeds or lubricates the PTO gear and bearings. An oil filter 76 is preferably provided. A radiator 69 (See FIG. 15) is also used to cool the lubricant such as a lubricating oil or automatic transmission fluid. With such lubrication system, cooling may be achieved even where the impeller shaft 40 is not engaged. Alternatively, cooling may be accomplished by circulating lubricant through a heat exchanger (not shown). Filter 76 connects with lubricant tube 78 which re-circulates lubricant from the housing 22 back to oil pump 64. Lubricant exits fitting 65 (See FIG. 6, FIG. 15) to an optional heat exchanger or radiator 69 for cooling of the lubricant. Lubricant may return to a fitting, for example a fitting 67 (see FIG. 1) for passage to bearings and gears generally at the impeller shaft 40 location.

Figure 11:
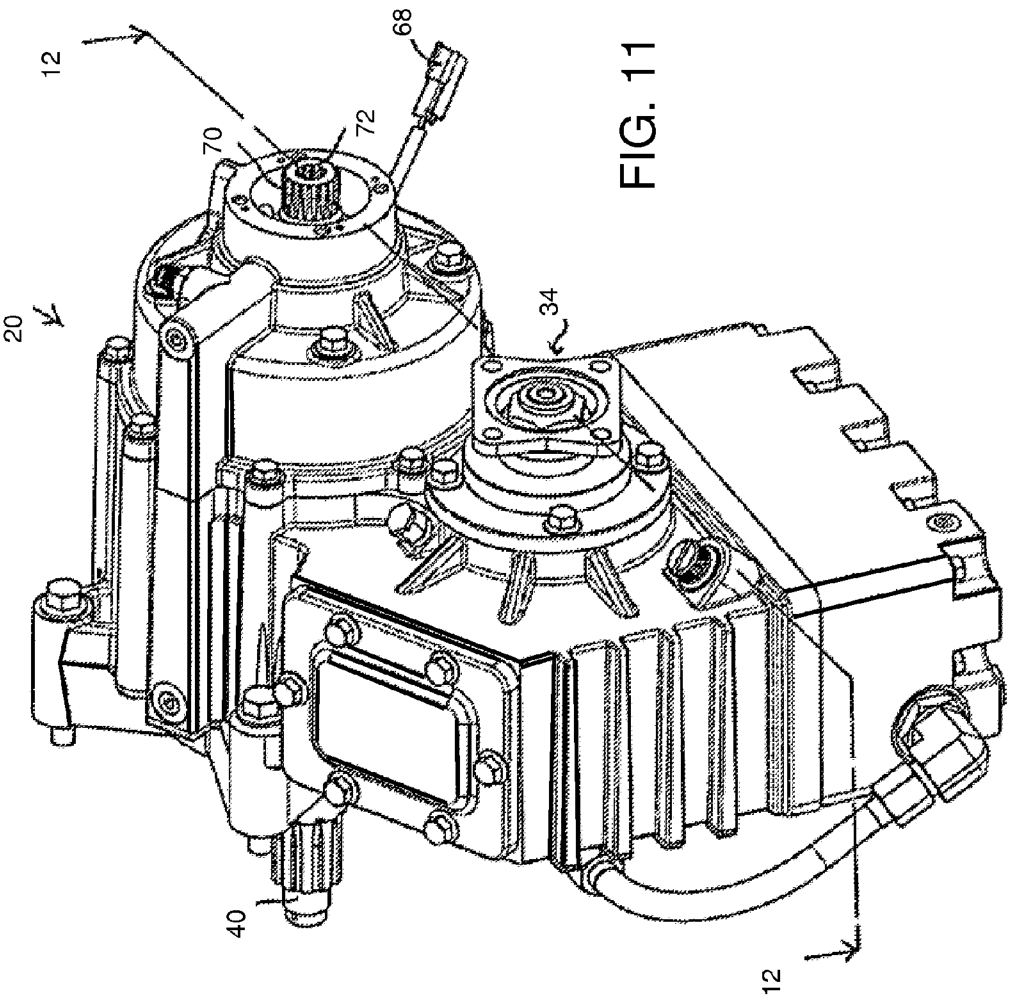
FIG. 11 is a perspective view of a firefighting pump transmission embodying the principles of the present invention and having an impeller cap removed.
Figure 12:
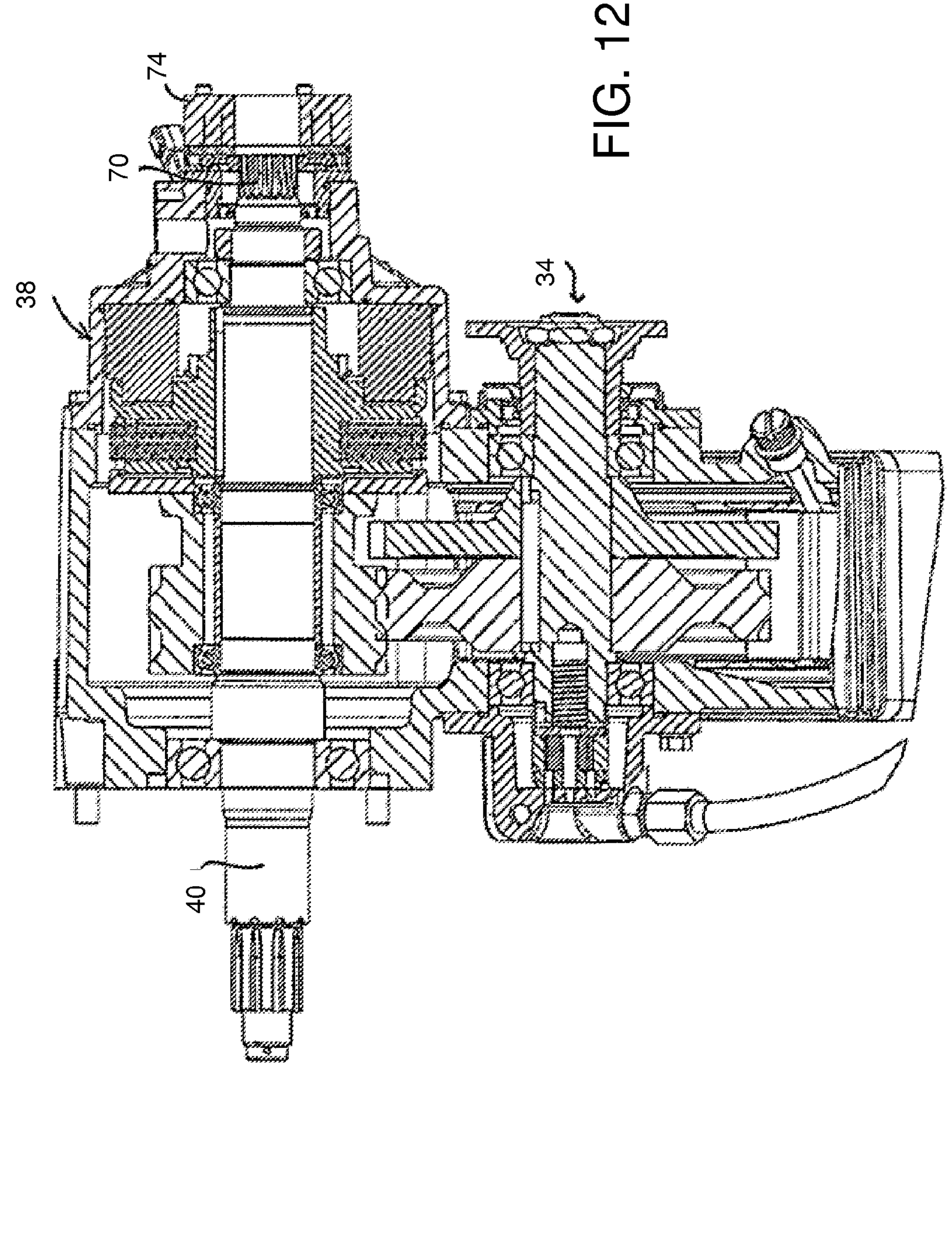
FIG. 12 is a section view taken along line 12-12 of FIG. 11.
Figure 13:
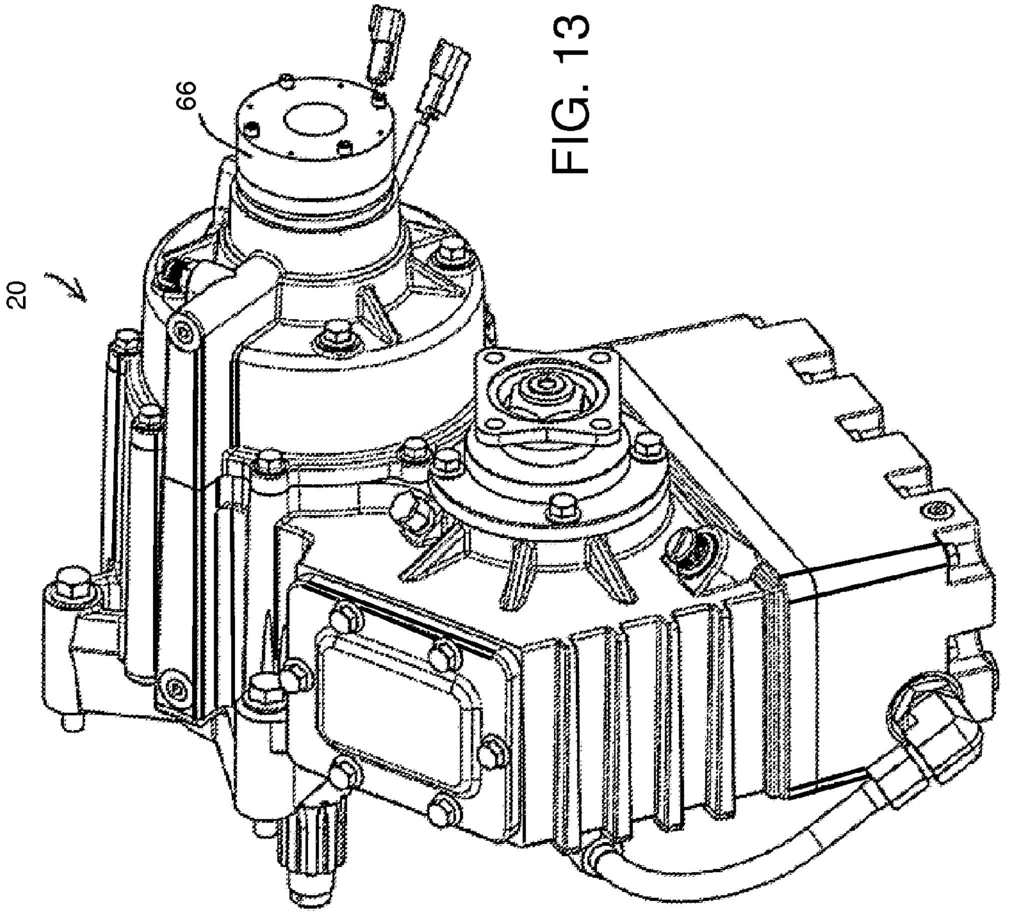
FIG. 13 is a perspective view of a firefighting pump transmission embodying the principles of the present invention.

Further as shown in FIGS. 11-13, impeller shaft 40 is preferably provided with an external spline 70. Brake 66 may be mounted to spline 70. Brake 66 allows for braking of shaft 40 to prevent shaft 40 from rotating when clutch 38 is disengaged. It may be appreciated that wire 68 is used to engage clutch 38 and/or brake 66. Preferably brake 66 is engaged when clutch 38 is disengaged and vice versa. Preferably, shaft 40 also includes internal spline 72. Spline 72 may also receive a hydraulic pump (not shown) or hydraulic pump adapter (not shown). Preferably hydraulic pump adapter is an SAE “A” 9 tooth spline. It may be appreciated that impeller cap 74 may be removed for installing the above brake 66 and/or hydraulic components. It may be appreciated that the hydraulic pump may also act as a brake to prevent shaft 40 from rotating when clutch 38 is disengaged. It may also be appreciated that internal spline 72 may operate equipment in addition to brakes or hydraulic pumps and functions as an additional power driving location.

The foregoing merely illustrates the principles of the invention. For example, although a multi-disk clutch 38 is mounted to the impeller shaft 40, it may be possible to use other clutch mechanisms to selectively turn “on” clutch 40.

It will thus be appreciated that those skilled in the art will be able to devise numerous alternative arrangements that, while not shown or described herein, embody the principles of the invention and thus are within its spirit and scope.

What is claimed is:

1. A transmission comprising:

a housing having a port, said housing configured to receive a PTO device having a driven gear which extends through said port;

an exit shaft extending from said housing;

a PTO driving gear affixed to an input drive shaft, said input drive shaft extending into said housing, said PTO driving gear affixed to said input drive shaft within said housing and configured to be driven by said input drive shaft and configured to drive a PTO device connected to said housing where the PTO device has a driven gear which extends through said port, said PTO driving gear positioned such that no portion of said PTO driving gear protrudes from said port, at least a portion of said input drive shaft positioned external said housing, said at least a portion configured to axially connect to, and receive power from, an external transmission;

a clutch driving gear affixed to said input drive shaft; and a clutch configured to power said exit shaft from said input drive shaft.

2. The transmission of claim 1 further comprising a PTO device mounted to said housing and having a driven gear extending through said port and meshing with said PTO gear.

3. The transmission of claim 2 further comprising a pump impeller connected to said exit shaft.

4. A transmission for selectively powering an output shaft, said transmission comprising:

a PTO driving gear configured to drive an external PTO device, said PTO driving gear affixed to an input drive shaft within a housing of said transmission, said input drive shaft having a connector portion positioned external said housing and configured to connect to and be driven by a shaft of an external transmission oriented axially from said input drive shaft;

a clutch driving gear affixed to said input drive shaft and meshed with a clutch gear of a clutch, said clutch configured to power the output shaft from said input drive shaft; and said housing including a port configured to receive a gear of a device to be driven by said PTO driving gear.

5. The transmission of claim 4 further comprising a plate configured to cover said port, said PTO driving gear free from meshing engagement with any other gear when said plate is connected to said housing.

6. The transmission of claim 4 were said output shaft is an impeller shaft connected to a pump impeller, said PTO driving gear meshed with the gear of the device to be driven by said PTO driving gear.

7. A firefighting device for selectively powering an impeller shaft, said firefighting device comprising:

a housing;

a PTO driving gear positioned at least partially within said housing, said PTO driving gear affixed to and driven by an input drive shaft of said firefighting device, at least a portion of said input drive shaft positioned external said housing, said at least a portion having an external transmission connector configured to connect to an external transmission in an axial direction of said input drive shaft to power said input drive shaft;

a clutch driving gear affixed to said input drive shaft;

a clutch configured to power the impeller shaft from said input drive shaft; and said housing having a port configured to receive a gear of a PTO device to be driven by said PTO driving gear.

8. The device of claim 7 where said clutch is a multi-disk clutch and where a chuck of said clutch mounts onto said impeller shaft.

9. The device of claim 7 where said clutch driving gear is coupled with a clutch gear of said clutch, said clutch is a multi-disk clutch where said PTO driving gear is positioned a first distance from disks of said clutch, said clutch driving gear positioned a second distance from said disks, the second distance being greater than the first distance.

10. The device of claim 9 where said external transmission connector includes a flange.

11. The device of claim 7 where said external transmission connector is defined in part by a terminal end of said input shaft.

12. The device of claim 7 further comprising a PTO device mounted to a housing of said firefighting device and engaged with said PTO driving gear.

13. The device of claim 12 where said PTO device is a PTO device configured to mount to said housing, said housing having mounts satisfying Society of Automotive Engineers Standard SAE J704 as of Dec. 14, 2007.

14. The device of claim 12 where said PTO device is mounted to a side of said housing of said transmission and where said device further includes a firefighting pump.

15. The device of claim 12 where said PTO device includes a drive line.

16. The device of claim 12 further comprising a lubrication pump capable of supplying pressured lubricant to said housing.

17. The device of claim 16 further comprising an exit fitting configured to supply lubricant to a radiator to cool the lubricant and at least one filter to filter the lubricant.

18. The device of claim 7 where said PTO driving gear is positioned entirely within said housing.

19. The device of claim 7 further comprising the PTO device connected to said housing and having the gear of the PTO device meshed with said PTO driving gear.

20. The device of claim 7 further comprising a plate configured to cover said port, said PTO driving gear free from meshing engagement with any other gear when said plate is connected to said housing.

21. The device of claim 7 further comprising an impeller shaft and a pump impeller connected to said impeller shaft.

* * * * *